US012087217B2

(12) United States Patent
Yang et al.

(10) Patent No.: US 12,087,217 B2
(45) Date of Patent: Sep. 10, 2024

(54) DISPLAY APPARATUS AND DISPLAY METHOD THEREFOR

(71) Applicant: BOE Technology Group Co., Ltd., Beijing (CN)

(72) Inventors: Fei Yang, Beijing (CN); Mingi Chu, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/767,728

(22) PCT Filed: May 12, 2021

(86) PCT No.: PCT/CN2021/093341
§ 371 (c)(1),
(2) Date: Apr. 8, 2022

(87) PCT Pub. No.: WO2022/001392
PCT Pub. Date: Jan. 6, 2022

(65) Prior Publication Data

US 2024/0096274 A1 Mar. 21, 2024

(30) Foreign Application Priority Data

Jun. 30, 2020 (CN) ......................... 202010618831.0

(51) Int. Cl.
*G09G 3/3225* (2016.01)

(52) U.S. Cl.
CPC ... *G09G 3/3225* (2013.01); *G09G 2320/0233* (2013.01)

(58) Field of Classification Search
CPC ......... G09G 3/3225; G09G 2320/0233; G09G 2300/026
See application file for complete search history.

(56) References Cited

U.S. PATENT DOCUMENTS 10,431,148 B2 * 10/2019 Kim ......................... G09G 3/32
11,282,474 B1 * 3/2022 Mosier ..................... G09G 3/20
(Continued)

FOREIGN PATENT DOCUMENTS

CN 101097680 A 1/2008
CN 101809644 A 8/2010
(Continued)

OTHER PUBLICATIONS

CN202010618831.0 first office action.

*Primary Examiner* — Ibrahim A Khan
(74) *Attorney, Agent, or Firm* — IPro, PLLC

(57) ABSTRACT

Disclosed are a display apparatus and a display method therefor. The display method includes: a frame of to-be-displayed image data is received; the frame of to-be-displayed image data is segmented into N frames of sub-image data corresponding to the N display panels in a one-to-one correspondence; for each display panel, an initial peak brightness parameter corresponding to the display panel is calculated according to the sub-image data corresponding to the display panel; for each display panel, a target peak brightness parameter corresponding to the display panel is calculated according to the initial peak brightness parameter corresponding to the display panel and an initial peak brightness parameter corresponding to an adjacent display panel; and display is performed by each display panel according to the sub-image data and the target peak brightness parameter corresponding to the display panel.

11 Claims, 7 Drawing Sheets

(56) References Cited

U.S. PATENT DOCUMENTS

| | | | | |
|---|---|---|---|---|
| 11,488,564 | B2 * | 11/2022 | Swatek | G09G 3/035 |
| 2008/0001857 | A1 | 1/2008 | Yoo | |
| 2009/0073079 | A1 * | 3/2009 | Miller | G09G 3/3216 345/1.3 |
| 2010/0085285 | A1 | 4/2010 | Ozawa et al. | |
| 2011/0037784 | A1 * | 2/2011 | Shiomi | G09G 3/3426 345/102 |
| 2011/0298763 | A1 * | 12/2011 | Mahajan | G09G 3/025 345/1.3 |
| 2013/0314459 | A1 | 11/2013 | Nakanishi | |
| 2014/0152721 | A1 | 6/2014 | Byun et al. | |
| 2014/0240201 | A1 * | 8/2014 | Takahashi | G09G 5/10 345/1.3 |
| 2015/0187262 | A1 | 7/2015 | Eom | |
| 2016/0093241 | A1 * | 3/2016 | Bastani | G09G 3/002 345/84 |
| 2016/0112690 | A1 * | 4/2016 | Yang | G03B 21/204 345/690 |
| 2016/0231975 | A1 * | 8/2016 | Kim | G06F 3/1446 |
| 2016/0358582 | A1 * | 12/2016 | Lee | G06F 3/1446 |
| 2016/0379555 | A1 | 12/2016 | Kim et al. | |
| 2017/0132963 | A1 | 5/2017 | Zhao | |
| 2017/0316754 | A1 * | 11/2017 | Katougi | G09G 3/2003 |
| 2018/0137839 | A1 * | 5/2018 | Kang | G09G 5/10 |
| 2018/0315355 | A1 * | 11/2018 | Hu | G09G 3/34 |
| 2019/0080643 | A1 * | 3/2019 | Yang | G09G 3/2096 |
| 2019/0228722 | A1 * | 7/2019 | Jeong | G09G 3/3426 |
| 2020/0027408 | A1 | 1/2020 | Xi et al. | |
| 2020/0081680 | A1 | 3/2020 | Im et al. | |
| 2020/0342819 | A1 * | 10/2020 | Cheng | G09G 3/342 |
| 2022/0093034 | A1 * | 3/2022 | Noh | H04N 5/21 |

FOREIGN PATENT DOCUMENTS

| | | | |
|---|---|---|---|
| CN | 102270445 | A | 12/2011 |
| CN | 103813116 | A | 5/2014 |
| CN | 103854604 | A | 6/2014 |
| CN | 104157216 | A | 11/2014 |
| CN | 104299601 | A | 1/2015 |
| CN | 104361837 | A | 2/2015 |
| CN | 104751787 | A | 7/2015 |
| CN | 104992670 | A | 10/2015 |
| CN | 105161059 | A | 12/2015 |
| CN | 106297654 | A | 1/2017 |
| CN | 106373493 | A | 2/2017 |
| CN | 106448576 | A | 2/2017 |
| CN | 106657955 | A | 5/2017 |
| CN | 107274848 | A | 10/2017 |
| CN | 108388416 | A | 8/2018 |
| CN | 108538260 | A | 9/2018 |
| CN | 110364113 | A | 10/2019 |
| CN | 110634417 | A | 12/2019 |
| GB | 2481122 | A | 12/2011 |
| IN | 110111732 | A | 8/2019 |

* cited by examiner

DISPLAY APPARATUS AND DISPLAY METHOD THEREFOR

CROSS REFERENCE TO RELATED APPLICATIONS

This application is a National Stage of International Application No. PCT/CN2021/093341, filed on May 12, 2021, which claims priority to Chinese Patent Application No. 202010618831.0, filed with the China National Intellectual Property Administration on Jun. 30, 2020, and entitled "Display Apparatus and Display Method therefor", both of which are hereby incorporated by reference in their entireties.

FIELD

The present disclosure relates to the field of display technologies, and particularly to a display apparatus and a display method therefor.

BACKGROUND

With the development of display technologies, large-screen television walls are more and more widely used in large-scale events due to the good visual shock and clear effects thereof. Since large and super-large television walls are difficult or impossible to produce directly and the production cost is extremely high, the splicing technology is widely used, that is, a plurality of display panels are spliced together to form a spliced display screen, and the plurality of display panels display different parts of an image at the same time, so that the large-screen splicing display of the spliced display screen is achieved.

However, the current spliced display screen is prone to producing a brightness difference at a splicing position, and when the brightness difference is larger, the display effect of the spliced display screen may be affected.

SUMMARY

Embodiments of the present disclosure provide a display apparatus and a display method therefor, and the specific scheme is as follows.

In a first aspect, an embodiment of the present disclosure provides a display method for a display apparatus, the display apparatus includes: N display panels, and N is an integer greater than 1; and the display method includes: receiving a frame of to-be-displayed image data; segmenting the frame of to-be-displayed image data into N frames of sub-image data corresponding to the N display panels in a one-to-one correspondence; for each display panel, calculating an initial peak brightness parameter corresponding to the display panel according to the sub-image data corresponding to the display panel; for each display panel, calculating a target peak brightness parameter corresponding to the display panel according to the initial peak brightness parameter corresponding to the display panel and an initial peak brightness parameter corresponding to an adjacent display panel; and performing display by each display panel according to the sub-image data and the target peak brightness parameter corresponding to the display panel.

Optionally, in an embodiment of the present disclosure, a display region of each display panel is divided into a central region and a peripheral region surrounding the central region; for each display panel, calculating the target peak brightness parameter corresponding to the display panel according to the initial peak brightness parameter corresponding to the display panel and the initial peak brightness parameter corresponding to the adjacent display panel, includes: for each display panel, determining the initial peak brightness parameter corresponding to the display panel as a target peak brightness parameter corresponding to the central region; and calculating a target peak brightness parameter corresponding to the peripheral region according to the initial peak brightness parameter corresponding to the display panel and the initial peak brightness parameter corresponding to the adjacent display panel; and performing display by each display panel according to the sub-image data corresponding to the display panel and the target peak brightness parameter includes: performing display by each display panel according to the target peak brightness parameters corresponding to the central region and the peripheral region respectively and the sub-image data.

Optionally, in an embodiment of the present disclosure, the display region of each display panel is divided into 9 display sub-regions of three rows by three columns; the display sub-region located in a second row and a second column is the central region; the peripheral region includes 4 first peripheral sub-regions and 4 second peripheral sub-regions; the display sub-region located in an $x^{th}$ row and a $y^{th}$ column is the first peripheral sub-region, where x=1 or 3, and y=1 or 3; the display sub-region located in an $n^{th}$ row and an $m^{th}$ column is the second peripheral sub-region, where n=2, m=1 or 3, or m=2, n=1 or 3; and calculating the target peak brightness parameter corresponding to the peripheral region according to the initial peak brightness parameter corresponding to the display panel and the initial peak brightness parameter corresponding to the adjacent display panel, includes: for each first peripheral sub-region in each display panel, calculating a target peak brightness parameter corresponding to the first peripheral sub-region according to the initial peak brightness parameter corresponding to the display panel, an initial peak brightness parameter corresponding to a display panel adjacent to the first peripheral sub-region in a row direction, an initial peak brightness parameter corresponding to a display panel adjacent to the first peripheral sub-region in a column direction, and an initial peak brightness parameter corresponding to a display panel adjacent to the first peripheral sub-region in a diagonal direction; and for each second peripheral sub-region in each display panel, calculating a target peak brightness parameter corresponding to the second peripheral sub-region according to the initial peak brightness parameter corresponding to the display panel, and an initial peak brightness parameter corresponding to a display panel adjacent to the second peripheral sub-region in a row direction or in a column direction.

Optionally, in an embodiment of the present disclosure, the target peak brightness parameter PBP corresponding to each first peripheral sub-region in each display panel is calculated according to a following formula: $PBP=k_1PBP_1+k_2PBP_2+k_3PBP_3+k_4PBP_4$; where, $PBP_1$ represents the initial peak brightness parameter corresponding to the display panel, $PBP_2$ represents the initial peak brightness parameter corresponding to the display panel adjacent to the first peripheral sub-region in the row direction, $PBP_3$ represents the initial peak brightness parameter corresponding to the display panel adjacent to the first peripheral sub-region in the column direction, and $PBP_4$ represents the initial peak brightness parameter corresponding to the display panel adjacent to the first peripheral sub-region in the diagonal direction; and $k_1$~$k_4$ represent weight coefficients, and $k_1 \geq k_2 = k_3 \geq k_4$.

Optionally, in an embodiment of the present disclosure, each first peripheral sub-region is divided into a plurality of sub-sub-regions in sequence in a direction away from a center of the display panel; and for a target peak brightness parameter $PBP=k_1PBP_1+k_2PBP_2+k_3PBP_3+k_4PBP_4$ corresponding to each sub-sub-region, the farther the sub-sub-region is from the center of the display panel, the smaller $k_1$ is, and the larger $k_2$, $k_3$ and $k_4$ are.

Optionally, in an embodiment of the present disclosure, in each first peripheral sub-region, a weight coefficient of the display panel of the sub-sub-region farthest from the center of the display panel equals to a weight coefficient corresponding to an adjacent display panel.

Optionally, in an embodiment of the present disclosure, the target peak brightness parameter PBP corresponding to each second peripheral sub-region in each display panel is calculated according to a following formula: $PBP=k_1PBP_1+k_2PBP_2$; where, $PBP_1$ represents the initial peak brightness parameter corresponding to the display panel, and $PBP_2$ represents the initial peak brightness parameter corresponding to the display panel adjacent to the second peripheral sub-region in the row direction or in the column direction; and $k_1$~$k_2$ represent weight coefficients, and $k_1 \geq k_2$.

Optionally, in an embodiment of the present disclosure, each second peripheral sub-region is divided into a plurality of sub-sub-regions in sequence in a direction away from a center of the display panel; and for a target peak brightness parameter $PBP=k_1PBP_1+k_2PBP_2$ corresponding to each sub-sub-region, the farther the sub-sub-region is from the center of the display panel, the smaller $k_1$ is, and the larger $k_2$ is.

Optionally, in an embodiment of the present disclosure, in each second peripheral sub-region, a weight coefficient of the display panel of the sub-sub-region farthest from the center of the display panel equals to a weight coefficient corresponding to an adjacent display panel.

Optionally, in an embodiment of the present disclosure, an area of the second peripheral sub-regions is greater than or equal to twice an area of the first peripheral sub-regions.

In a second aspect, an embodiment of the present disclosure provides a display apparatus, the display apparatus includes: N display panels, an image segmentation module, an initial peak brightness parameter calculation module and a target peak brightness parameter calculation module; N is an integer greater than 1; the image segmentation module is configured to receive a frame of to-be-displayed image data and segment the frame of to-be-displayed image data into N frames of sub-image data corresponding to the N display panels in a one-to-one correspondence, and send each frame of sub-image data to the corresponding display panel and the initial peak brightness parameter calculation module; the initial peak brightness parameter calculation module is configured to, for each display panel, calculate an initial peak brightness parameter corresponding to the display panel according to the sub-image data corresponding to the display panel; the target peak brightness parameter calculation module is configured to, for each display panel, calculate a target peak brightness parameter corresponding to the display panel according to the initial peak brightness parameter corresponding to the display panel and an initial peak brightness parameter corresponding to an adjacent display panel; and each display panel is configured to perform display according to the sub-image data and the target peak brightness parameter corresponding to the display panel.

Optionally, in an embodiment of the present disclosure, a display region of each display panel is divided into a central region and a peripheral region surrounding the central region; the target peak brightness parameter calculation module is configured to: for each display panel, determine the initial peak brightness parameter corresponding to the display panel as a target peak brightness parameter corresponding to the central region; and calculate a target peak brightness parameter corresponding to the peripheral region according to the initial peak brightness parameter corresponding to the display panel and the initial peak brightness parameter corresponding to the adjacent display panel; and each display panel is configured to perform display according to the target peak brightness parameters corresponding to the central region and the peripheral region respectively and the sub-image data.

Optionally, in an embodiment of the present disclosure, the display region of each display panel is divided into 9 display sub-regions of three rows by three columns; the display sub-region located in a second row and a second column is the central region; the peripheral region includes 4 first peripheral sub-regions and 4 second peripheral sub-regions; the display sub-region located in an $x^{th}$ row and a $y^{th}$ column is the first peripheral sub-region, where x=1 or 3, and y=1 or 3; the display sub-region located in an $n^{th}$ row and an $m^{th}$ column is the second peripheral sub-region, where n=2, m=1 or 3, or m=2, n=1 or 3; for each first peripheral sub-region in each display panel, the target peak brightness parameter calculation module is configured to calculate a target peak brightness parameter corresponding to the first peripheral sub-region according to the initial peak brightness parameter corresponding to the display panel, an initial peak brightness parameter corresponding to a display panel adjacent to the first peripheral sub-region in a row direction, an initial peak brightness parameter corresponding to a display panel adjacent to the first peripheral sub-region in a column direction, and an initial peak brightness parameter corresponding to a display panel adjacent to the first peripheral sub-region in a diagonal direction; and for each second peripheral sub-region in each display panel, the target peak brightness parameter calculation module is configured to calculate a target peak brightness parameter corresponding to the second peripheral sub-region according to the initial peak brightness parameter corresponding to the display panel, and an initial peak brightness parameter corresponding to a display panel adjacent to the second peripheral sub-region in a row direction or in a column direction.

Optionally, in an embodiment of the present disclosure, the target peak brightness parameter calculation module is configured to calculate the target peak brightness parameter PBP corresponding to each first peripheral sub-region in each display panel according to a following formula: $PBP=k_1PBP_1+k_2PBP_2+k_3PBP_3+k_4PBP_4$; where, $PBP_1$ represents the initial peak brightness parameter corresponding to the display panel, $PBP_2$ represents the initial peak brightness parameter corresponding to the display panel adjacent to the first peripheral sub-region in the row direction, $PBP_3$ represents the initial peak brightness parameter corresponding to the display panel adjacent to the first peripheral sub-region in the column direction, and $PBP_4$ represents the initial peak brightness parameter corresponding to the display panel adjacent to the first peripheral sub-region in the diagonal direction; and $k_1$~$k_4$ represent weight coefficients, and $k_1 \geq k_2 = k_3 \geq k_4$.

Optionally, in an embodiment of the present disclosure, each first peripheral sub-region is divided into a plurality of sub-sub-regions in sequence in a direction away from a center of the display panel; and for a target peak brightness parameter $PBP=k_1PBP_1+k_2PBP_2+k_3PBP_3+k_4PBP_4$ corresponding to each sub-sub-region, the farther the sub-sub-region is from the center of the display panel, the smaller $k_1$ is, and the larger $k_2$, $k_3$ and $k_4$ are.

Optionally, in an embodiment of the present disclosure, in each first peripheral sub-region, a weight coefficient of the display panel of the sub-sub-region farthest from the center of the display panel equals to a weight coefficient corresponding to an adjacent display panel.

Optionally, in an embodiment of the present disclosure, the target peak brightness parameter calculation module is configured to calculate the target peak brightness parameter PBP corresponding to each second peripheral sub-region in each display panel according to a following formula: $PBP=k_1PBP_1+k_2PBP_2$; where, $PBP_1$ represents the initial peak brightness parameter corresponding to the display panel, and $PBP_2$ represents the initial peak brightness parameter corresponding to the display panel adjacent to the second peripheral sub-region in the row direction or in the column direction; and $k_1$~$k_2$ represent weight coefficients, and $k_1 \geq k_2$.

Optionally, in an embodiment of the present disclosure, each second peripheral sub-region is divided into a plurality of sub-sub-regions in sequence in a direction away from a center of the display panel; and for a target peak brightness parameter $PBP=k_1PBP_1+k_2PBP_2$ corresponding to each sub-sub-region, the farther the sub-sub-region is from the center of the display panel, the smaller $k_1$ is, and the larger $k_2$ is.

Optionally, in an embodiment of the present disclosure, in each second peripheral sub-region, a weight coefficient of the display panel of the sub-sub-region farthest from the center of the display panel equals to a weight coefficient corresponding to an adjacent display panel.

DETAILED DESCRIPTION OF EMBODIMENTS

Figure 1:
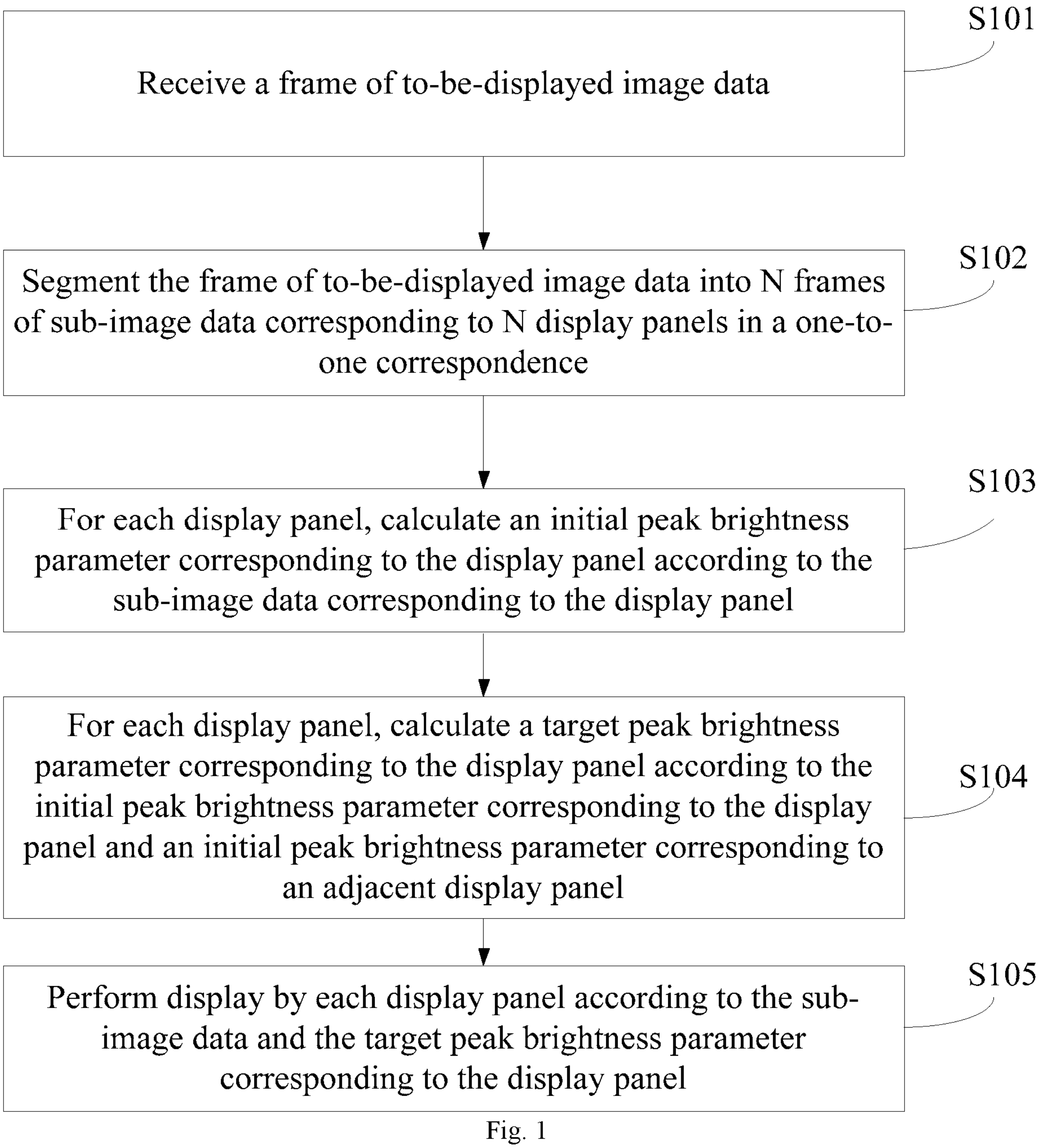
FIG. 1 is a flow diagram of a display method provided by an embodiment of the present disclosure.

In order to achieve the display effect of high contrast and low power consumption, a display screen may dynamically adjust output brightness according to each frame of display picture, that is, adjust a peak brightness parameter (PBP) corresponding to each frame of picture.

PBP=P_real/P_max, P_max is the power consumption required when the display screen displays the picture with the maximum power consumption, and P_real is the power consumption required when the display screen displays the current frame of picture.

In the spliced display screen, since the peak brightness parameter for adjusting the output brightness by each display panel is obtained according to the display picture, when picture contents displayed by different display panels are different, a brightness difference is prone to being caused in a splicing region, thereby affecting the overall picture quality of the spliced display screen.

In view of this, embodiments of the present disclosure provide a display apparatus and a display method therefor, to alleviate the brightness difference at the splicing position.

In order to make the above objectives, features and advantages of the present disclosure more clearly understood, the present disclosure will be further described below with reference to the accompanying drawings and embodiments. Example implementations, however, may be embodied in various forms and should not be construed as limited to embodiments set forth herein; rather, these implementations are provided so that the present disclosure will be thorough and complete, and the concept of example implementations will be fully conveyed to those skilled in the art. The same reference numerals in the drawings denote the same or similar structures, and thus their repeated descriptions will be omitted. The words expressing positions and directions described in the present disclosure are all described by taking the accompanying drawings as examples, but changes may also be made as required, and the changes are all included in the protection scope of the present disclosure. The drawings of the present disclosure are only used to illustrate the relative positional relationship and do not represent actual scales.

It should be noted that specific details are set forth in the following description in order to facilitate a full understanding of the present disclosure. However, the present disclosure may be implemented in many other ways different from those described herein, and those skilled in the art can make similar promotions without departing from the connotation of the present disclosure. Accordingly, the present disclosure is not limited by the specific embodiments disclosed below. Subsequent descriptions in the specification are implementations for implementing the present disclosure. However, the descriptions are for the purpose of illustrating the general principles of the present disclosure and are not intended to limit the scope of the present disclosure. The protection scope of the present disclosure should be defined by the appended claims.

The display apparatus and the display method therefor provided by embodiments of the present disclosure will be described in detail below with reference to the accompanying drawings.

An embodiment of the present disclosure provides a display method for a display apparatus. The display apparatus includes: N display panels, and N is an integer greater than 1.

As shown in FIG. 1, the display method includes following steps.

S101, a frame of to-be-displayed image data is received.

S102, the frame of to-be-displayed image data is segmented into N frames of sub-image data corresponding to the N display panels in a one-to-one correspondence.

S103, for each display panel, an initial peak brightness parameter corresponding to the display panel is calculated according to the sub-image data corresponding to the display panel.

S104, for each display panel, a target peak brightness parameter corresponding to the display panel is calculated according to the initial peak brightness parameter corresponding to the display panel and an initial peak brightness parameter corresponding to an adjacent display panel.

S105, each display panel performs display according to the sub-image data and the target peak brightness parameter corresponding to the display panel.

According to the above display method provided by an embodiment of the present disclosure, the frame of to-be-displayed image data is received, and then the frame of to-be-displayed image data is segmented into the N frames of sub-image data corresponding to the N display panels in a one-to-one correspondence; for each display panel, the initial peak brightness parameter corresponding to the display panel is calculated according to the sub-image data corresponding to the display panel, and the target peak brightness parameter corresponding to the display panel is calculated according to the initial peak brightness parameter corresponding to the display panel and the initial peak brightness parameter corresponding to an adjacent display panel; and each display panel performs display according to the sub-image data and the target peak brightness parameter corresponding to the display panel. Since the target peak brightness parameter corresponding to each display panel is obtained according to the initial peak brightness parameter corresponding to the display panel and the initial peak brightness parameter corresponding to the adjacent display panel, that is, output brightness of each display panel considers its own screen content and also considers screen content of the adjacent display panel, so that an output brightness difference between the adjacent display panels is reduced, the brightness difference between the adjacent display panels at a splicing position is alleviated, and the overall display effect of the display apparatus is improved.

Figure 2:
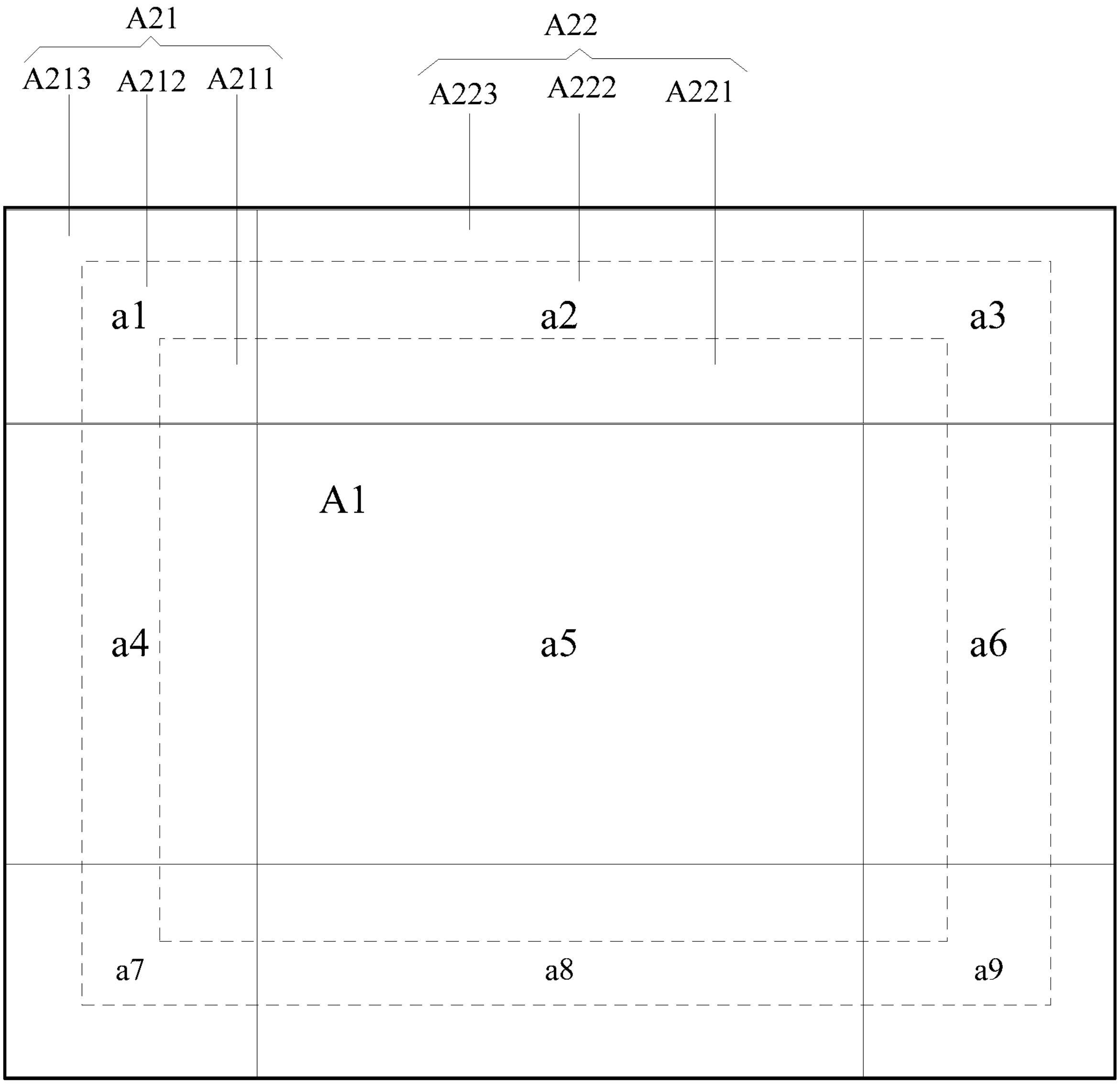
FIG. 2 is a schematic diagram of positions of display sub-regions of a display panel in a display apparatus provided by an embodiment of the present disclosure.

Optionally, in the above display method provided by an embodiment of the present disclosure, as shown in FIG. 2, a display region of each display panel is divided into a central region A1 and peripheral regions A21 and A22 surrounding the central region A1.

In the step S104, for each display panel, the target peak brightness parameter corresponding to the display panel is calculated according to the initial peak brightness parameter corresponding to the display panel and the initial peak brightness parameter corresponding to the adjacent display panel, includes: for each display panel, the initial peak brightness parameter corresponding to the display panel is determined as a target peak brightness parameter corresponding to the central region; and a target peak brightness parameter corresponding to each peripheral region is calculated according to the initial peak brightness parameter corresponding to the display panel and the initial peak brightness parameter corresponding to the adjacent display panel.

In the step S105, each display panel performs display according to the sub-image data and the target peak brightness parameter corresponding to the display panel includes: the display panel performs display according to the target peak brightness parameters corresponding to the central region and the peripheral regions respectively and the sub-image data.

In the above embodiment, the initial peak brightness parameter corresponding to the display panel is used as the target peak brightness parameter corresponding to the central region, to ensure the display quality of the display panel. The target peak brightness parameters corresponding to the peripheral regions are calculated according to the initial peak brightness parameter corresponding to the display panel and the initial peak brightness parameter corresponding to the adjacent display panel, and the brightness difference of the adjacent display panels at the splicing position is reduced on the basis of ensuring the display quality of the peripheral regions of the display panel.

Optionally, in the above display method provided by an embodiment of the present disclosure, as shown in FIG. 2, the display region of each display panel is divided into 9 display sub-regions a1~a9 of three rows by three columns.

The display sub-region a5 located in a second row and a second column is the central region A1.

The peripheral regions include 4 first peripheral sub-regions A21 and 4 second peripheral sub-regions A22; the display sub-regions (a1, a3, a7 and a9) located in an $x^{th}$ row and a $y^{th}$ column are the first peripheral sub-regions A21, where x=1 or 3, and y=1 or 3; and the display sub-region (a2, a4, a6 and a8) located in an $n^{th}$ row and an $m^{th}$ column are the second peripheral sub-regions A22, where n=2, m=1 or 3, or m=2, n=1 or 3.

During specific implementation, calculating the target peak brightness parameters corresponding to the peripheral regions according to the initial peak brightness parameter corresponding to the display panel and the initial peak brightness parameter corresponding to the adjacent display panel, includes: for each first peripheral sub-region in each display panel, a target peak brightness parameter corresponding to the first peripheral sub-region is calculated according to the initial peak brightness parameter corresponding to the display panel, an initial peak brightness parameter corresponding to a display panel adjacent to the first peripheral sub-region in a row direction, an initial peak brightness parameter corresponding to a display panel adjacent to the first peripheral sub-region in a column direction, and an initial peak brightness parameter corresponding to a display panel adjacent to the first peripheral sub-region in a diagonal direction; and for each second peripheral sub-region in each display panel, a target peak brightness parameter corresponding to the second peripheral sub-region is calculated according to the initial peak brightness parameter corresponding to the display panel, and an initial peak brightness parameter corresponding to a display panel adjacent to the second peripheral sub-region in a row direction or in a column direction.

Figure 3:
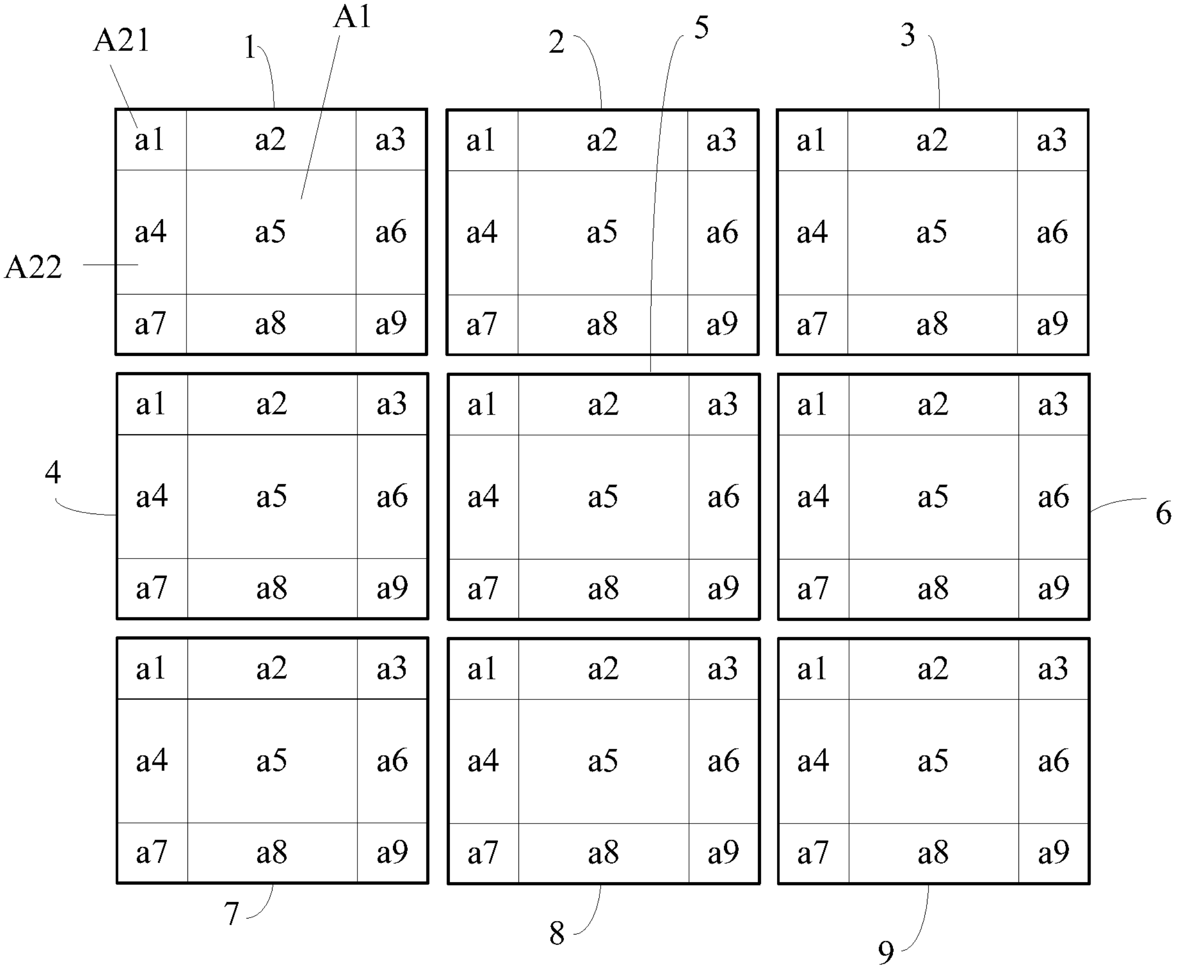
FIG. 3 is a schematic diagram of positions of display panels in a display apparatus provided by an embodiment of the present disclosure.

For example, by taking the display panel 1 in FIG. 3 as an example, for each first peripheral sub-region in the display panel 1, the display sub-region a1 has no adjacent display panel, and the target peak brightness parameter corresponding to the display sub-region a1 is calculated only according to the initial peak brightness parameter corresponding to the display panel 1. Only the display panel 4 is adjacent to the display sub-region a7 in the column direction, so that the target peak brightness parameter corresponding to the display sub-region a7 is calculated only according to the initial peak brightness parameter corresponding to the display panel 1 and the initial peak brightness parameter corresponding to the display panel 4. Only the display panel 2 is adjacent to the display sub-region a3 in the row direction, so that the target peak brightness parameter corresponding to the display sub-region a3 is calculated only according to the initial peak brightness parameter corresponding to the display panel 1 and the initial peak brightness parameter corresponding to the display panel 2. The display panel 4 is adjacent to the display sub-region a9 in the column direction, the display panel 2 is adjacent to the display sub-region a9 in the row direction, and the display panel 5 is adjacent to the display sub-region a9 in the diagonal direction, so that the target peak brightness parameter corresponding to the display sub-region a9 needs to be calculated according to the initial peak brightness parameter corresponding to the display panel 1, the initial peak brightness parameter corresponding to the display panel 2, the initial peak brightness parameter corresponding to the display panel 4, and the initial peak brightness parameter corresponding to the display panel 5. The calculation principle of the target peak brightness parameter corresponding to each first peripheral sub-region in other display panels is similar to that of the display panel 1, which is not repeated here.

Still by taking the display panel 1 in FIG. 3 as an example, for each second peripheral sub-region in the display panel 1, the display sub-regions a2 and a4 have no adjacent display panel, and the target peak brightness parameters corresponding to the display sub-regions a2 and a4 are calculated only according to the initial peak brightness parameter corresponding to the display panel 1. Only the display panel 4 is adjacent to the display sub-region a8 in the column direction, so that the target peak brightness parameter corresponding to the display sub-region a8 is calculated only according to the initial peak brightness parameter corresponding to the display panel 1 and the initial peak brightness parameter corresponding to the display panel 4. Only the display panel 2 is adjacent to the display sub-region a6 in the row direction, so that the target peak brightness parameter corresponding to the display sub-region a6 is calculated only according to the initial peak brightness parameter corresponding to the display panel 1 and the initial peak brightness parameter corresponding to the display panel 2. The calculation principle of the target peak brightness parameter corresponding to each second peripheral sub-region in other display panels is similar to that of the display panel 1, which is not repeated here.

Optionally, in the above display method provided by an embodiment of the present disclosure, the target peak brightness parameter PBP corresponding to each first peripheral sub-region in each display panel is calculated according to a following formula: $PBP=k_1PBP_1+k_2PBP_2+k_3PBP_3+k_4PBP_4$.

Where, $PBP_1$ represents the initial peak brightness parameter corresponding to the display panel, $PBP_2$ represents the initial peak brightness parameter corresponding to the display panel adjacent to the first peripheral sub-region in the row direction, $PBP_3$ represents the initial peak brightness parameter corresponding to the display panel adjacent to the first peripheral sub-region in the column direction, $PBP_4$ represents the initial peak brightness parameter corresponding to the display panel adjacent to the first peripheral sub-region in the diagonal direction; and $k_1$~$k_4$ represent weight coefficients, and $k_1 \geq k_2 = k_3 \geq k_4$.

It should be noted that, in the present disclosure, for each first peripheral sub-region, when the first peripheral sub-region has no adjacent display panel in the row direction, $PBP_2=0$, and $k_2=0$; when the first peripheral sub-region has no adjacent display panel in the column direction, $PBP_3=0$, and $k_3=0$; and when the first peripheral sub-region has no adjacent display panel in the diagonal direction, $PBP_4=0$, and $k_4=0$.

Optionally, in some embodiments, for each first peripheral sub-region, a weight coefficient of the display panel equals to a weight coefficient corresponding to an adjacent display panel, so that the target peak brightness parameters of the adjacent first peripheral sub-regions of the adjacent display panels are the same, that is, at the splicing position, the target peak brightness parameters of the adjacent display panels are the same. For example, for the display sub-region a9 of the display panel 1, the display sub-region a7 of the display panel 2, the display sub-region a3 of the display panel 4 and the display sub-region a1 of the display panel 5 in FIG. 3, since $k_1=k_2=k_3=k_4=1/4$, the target peak brightness parameters corresponding to the display sub-regions a9, a7, a3 and a1 are the same. For example, for the display sub-region a3 of the display panel 1 and the display sub-region a1 of the display panel 2 in FIG. 3, since $k_3=0$, $k_4=0$, and $k_1=k_2=1/2$, the target peak brightness parameters corresponding to the display sub-regions a3 and a1 are the same. For example, for the display sub-region a7 of the display panel 1 and the display sub-region a1 of the display panel 4 in FIG. 3, since $k_2=0$, $k_4=0$, and $k_1=k_3=1/2$, the target peak brightness parameters corresponding to the display sub-regions a7 and a1 are the same, thereby alleviating the brightness difference between the adjacent display panels at the splicing position.

Optionally, in some embodiments, as shown in FIG. 2, the first peripheral sub-region A21 is divided into a plurality of sub-sub-regions A211~A213 (by taking 3 sub-sub-regions as an example in FIG. 2) in sequence in a direction away from a center of the display panel.

For a target peak brightness parameter $PBP=k_1PBP_1+k_2PBP_2+k_3PBP_3+k_4PBP_4$ corresponding to each sub-sub-region, the farther the sub-sub-region is from the center of the display panel, the smaller $k_1$ is, and the larger $k_2$, $k_3$ and $k_4$ are. For example, in FIG. 2, from the sub-sub-region A211 to the sub-sub-region A213, $k_1$ becomes smaller and smaller, and $k_2$, $k_3$ and $k_4$ become larger and larger.

In the above embodiment, the target peak brightness parameters corresponding to the first peripheral sub-regions are gradually transitioned from the target peak brightness parameter corresponding to the central region to be close to the target peak brightness parameters corresponding to the first peripheral sub-regions of the adjacent display panels, thereby further improving the display quality.

Optionally, in some embodiments, in each first peripheral sub-region, a weight coefficient of the display panel of the sub-sub-region farthest from the center of the display panel equals to a weight coefficient corresponding to an adjacent display panel. For example, in FIG. 2, if the sub-sub-region A213 has an adjacent display panel only in the row direction, then $k_1=k_2=1/2$, if the sub-sub-region A213 has an adjacent display panel only in the column direction, then $k_1=k_3=1/2$, and if the sub-sub-region A213 has adjacent display panels in the row direction, the column direction and the diagonal direction, then $k_1=k_2=k_3=k_4=1/4$. Therefore, at the splicing position, the target peak brightness parameters of the adjacent display panels are the same, thereby alleviating the brightness difference between the adjacent display panels at the splicing position.

Optionally, in some embodiments, the target peak brightness parameter PBP corresponding to each second peripheral sub-region in each display panel is calculated according to a following formula: $PBP=k_1PBP_1+k_2PBP_2$.

Where, $PBP_1$ represents the initial peak brightness parameter corresponding to the display panel, and $PBP_2$ represents the initial peak brightness parameter corresponding to the display panel adjacent to the second peripheral sub-region in the row direction or in the column direction; and $k_1$~$k_2$ represent weight coefficients, $k_1 \geq k_2$, and $k_1+k_2=1$.

It should be noted that, in the present disclosure, for each second peripheral sub-region, when the second peripheral sub-region has no adjacent display panel in the row direction and the column direction, $PBP_2=0$, and $k_2=0$.

Optionally, in some embodiments, for each second peripheral sub-region, when the second peripheral sub-region has an adjacent display panel, $k_1=k_2=1/2$, so that the target peak brightness parameters of the adjacent second peripheral sub-regions of the adjacent display panels are the same, that is, at the splicing position, the target peak brightness parameters of the adjacent display panels are the same. As shown in FIG. 3, the target peak brightness parameters of the display sub-region a6 of the display panel 1 and the display sub-region a4 of the display panel 2 are the same, thereby alleviating the brightness difference between the adjacent display panels at the splicing position.

Optionally, in some embodiments, as shown in FIG. 2, the second peripheral sub-region A22 is divided into a plurality of sub-sub-regions A221~A223 (by taking 3 sub-sub-regions as an example in FIG. 2) in sequence in the direction away from the center of the display panel.

For a target peak brightness parameter $PBP=k_1PBP_1+k_2PBP_2$ corresponding to each sub-sub-region, the farther the sub-sub-region is from the center of the display panel, the smaller $k_1$ is, and the larger $k_2$ is. For example, in FIG. 2, from the sub-sub-region A221 to the sub-sub-region A223, $k_1$ becomes smaller and smaller, and $k_2$ becomes larger and larger.

In the above embodiment, the target peak brightness parameters corresponding to the second peripheral sub-regions are gradually transitioned from the target peak brightness parameter corresponding to the central region to be close to the target peak brightness parameters corresponding to the second peripheral sub-regions of the adjacent display panels, thereby further improving the display quality.

Optionally, in some embodiments, in each second peripheral sub-region, a weight coefficient of the display panel of the sub-sub-region farthest from the center of the display panel equals to a weight coefficient corresponding to an adjacent display panel. For example, in FIG. 2, for the sub-sub-region A223, if there is a display panel adjacent to the sub-sub-region A223, $k_1=k_2=½$. That is, at the splicing position, the target peak brightness parameters of the adjacent display panels are the same, thereby alleviating the brightness difference between the adjacent display panels at the splicing position.

In the display panel, a range of the peripheral regions may be determined according to the actual brightness difference such as a size of the display panel, which is not limited here. Optionally, in some embodiments, when an area of the second peripheral sub-regions A22 is greater than or equal to twice an area of the first peripheral sub-regions A21, the display effect is better.

Figure 4:
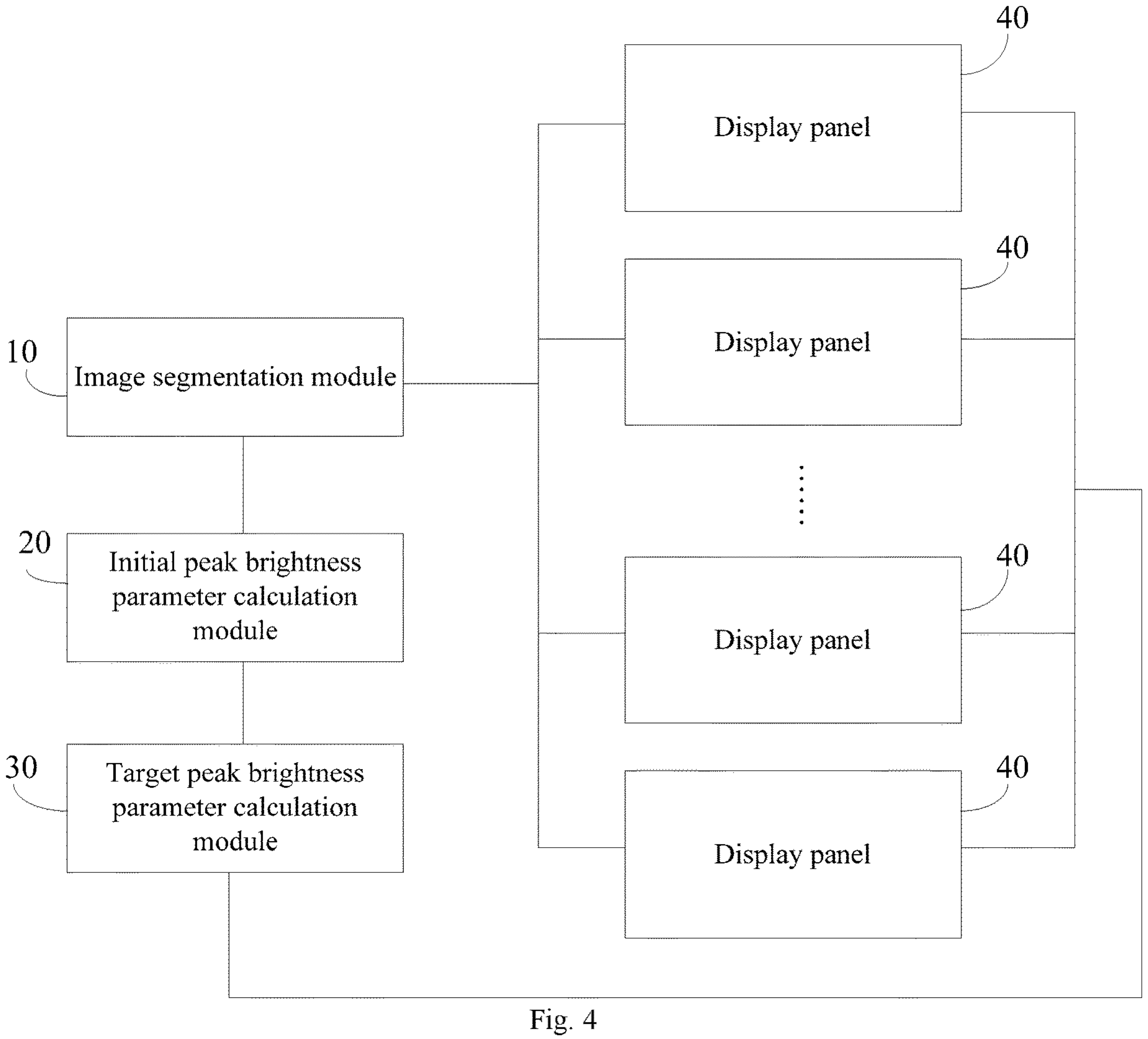
FIG. 4 is a first schematic structural diagram of a display apparatus provided by an embodiment of the present disclosure.

Based on the same inventive concept, an embodiment of the present disclosure further provides an apparatus, as shown in FIG. 4, including: N display panels 40, an image segmentation module 10, an initial peak brightness parameter calculation module 20 and a target peak brightness parameter calculation module 30; N is an integer greater than 1.

The image segmentation module 10 is configured to receive a frame of to-be-displayed image data and segment the frame of to-be-displayed image data into N frames of sub-image data corresponding to the N display panels 40 in a one-to-one correspondence.

The initial peak brightness parameter calculation module 20 is configured to, for each display panel, calculate an initial peak brightness parameter corresponding to the display panel 40 according to the sub-image data corresponding to the display panel.

The target peak brightness parameter calculation module 30 is configured to, for each display panel 40, calculate a target peak brightness parameter corresponding to the display panel according to the initial peak brightness parameter corresponding to the display panel and an initial peak brightness parameter corresponding to an adjacent display panel 40.

Each display panel 40 is configured to perform display according to the sub-image data and the target peak brightness parameter corresponding to the display panel.

According to the above display apparatus provided by an embodiment of the present disclosure, the image segmentation module receives the frame of to-be-displayed image data and segments the frame of to-be-displayed image data into the N frames of sub-image data corresponding to the N display panels in a one-to-one correspondence; for each display panel, the initial peak brightness parameter calculation module calculates the initial peak brightness parameter corresponding to the display panel according to the sub-image data corresponding to the display panel; for each display panel, the target peak brightness parameter calculation module calculates the target peak brightness parameter corresponding to the display panel according to the initial peak brightness parameter corresponding to the display panel and the initial peak brightness parameter corresponding to the adjacent display panel; and each display panel performs display according to the sub-image data and the target peak brightness parameter corresponding to the display panel. Since the target peak brightness parameter corresponding to each display panel is obtained according to the initial peak brightness parameter corresponding to the display panel and the initial peak brightness parameter corresponding to the adjacent display panel, that is, output brightness of each display panel considers its own screen content and also considers screen content of the adjacent display panel, so that an output brightness difference between the adjacent display panels is reduced, the brightness difference between the adjacent display panels at a splicing position is alleviated, and the overall display effect of the display apparatus is improved.

Optionally, in the above display apparatus provided by an embodiment of the present disclosure, as shown in FIG. 2, a display region of each display panel is divided into a central region A1 and peripheral regions A21 and A22 surrounding the central region A1. The target peak brightness parameter calculation module is configured to: for each display panel, determine the initial peak brightness parameter corresponding to the display panel as a target peak brightness parameter corresponding to the central region; and calculate a target peak brightness parameter corresponding to each peripheral region according to the initial peak brightness parameter corresponding to the display panel and the initial peak brightness parameter corresponding to the adjacent display panel.

Each display panel is configured to perform display according to the target peak brightness parameters corresponding to the central region and the peripheral regions respectively and the sub-image data.

Optionally, in the above display apparatus provided by an embodiment of the present disclosure, as shown in FIG. 2, the display region of each display panel is divided into 9 display sub-regions a1~a9 of three rows by three columns.

The display sub-region a5 located in a second row and a second column is the central region A1.

the peripheral regions include 4 first peripheral sub-regions A21 and 4 second peripheral sub-regions A22; the display sub-regions (a1, a3, a7 and a9) located in an $x^{th}$ row and a $y^{th}$ column are the first peripheral sub-regions A21, where x=1 or 3, and y=1 or 3; and the display sub-region (a2, a4, a6 and a8) located in an $n^{th}$ row and an $m^{th}$ column are the second peripheral sub-regions A22, where n=2, m=1 or 3, or m=2, n=1 or 3.

For each first peripheral sub-region in each display panel, the target peak brightness parameter calculation module is configured to calculate a target peak brightness parameter corresponding to the first peripheral sub-region according to the initial peak brightness parameter corresponding to the display panel, an initial peak brightness parameter corresponding to a display panel adjacent to the first peripheral sub-region in a row direction, an initial peak brightness parameter corresponding to a display panel adjacent to the first peripheral sub-region in a column direction, and an initial peak brightness parameter corresponding to a display panel adjacent to the first peripheral sub-region in a diagonal direction.

For each second peripheral sub-region in each display panel, the target peak brightness parameter calculation module is configured to calculate a target peak brightness parameter corresponding to the second peripheral sub-region according to the initial peak brightness parameter corresponding to the display panel, and an initial peak brightness parameter corresponding to a display panel adjacent to the second peripheral sub-region in a row direction or in a column direction.

Optionally, in the above display apparatus provided by an embodiment of the present disclosure, the target peak brightness parameter calculation module is configured to calculate the target peak brightness parameter PBP corresponding to each first peripheral sub-region in each display panel according to a following formula: $PBP=k_1PBP_1+k_2PBP_2+k_3PBP_3+k_4PBP_4$.

Where, $PBP_1$ represents the initial peak brightness parameter corresponding to the display panel, $PBP_2$ represents the initial peak brightness parameter corresponding to the display panel adjacent to the first peripheral sub-region in the row direction, $PBP_3$ represents the initial peak brightness parameter corresponding to the display panel adjacent to the first peripheral sub-region in the column direction, and $PBP_4$ represents the initial peak brightness parameter corresponding to the display panel adjacent to the first peripheral sub-region in the diagonal direction; and $k_1$~$k_4$ represent weight coefficients, and $k_1 \geq k_2 = k_3 \geq k_4$.

Optionally, in the above display apparatus provided by an embodiment of the present disclosure, each first peripheral sub-region is divided into a plurality of sub-sub-regions in sequence in a direction away from a center of the display panel.

For a target peak brightness parameter $PBP=k_1PBP_1+k_2PBP_2+k_3PBP_3+k_4PBP_4$ corresponding to each sub-sub-region, the farther the sub-sub-region is from the center of the display panel, the smaller $k_1$ is, and the larger $k_2$, $k_3$ and $k_4$ are.

Optionally, in the above display apparatus provided by an embodiment of the present disclosure, in each first peripheral sub-region, a weight coefficient of the display panel of the sub-sub-region farthest from the center of the display panel equals to a weight coefficient corresponding to an adjacent display panel.

Optionally, in the above display apparatus provided by an embodiment of the present disclosure, the target peak brightness parameter calculation module is configured to calculate the target peak brightness parameter PBP corresponding to each second peripheral sub-region in each display panel according to a following formula: $PBP=k_1PBP_1+k_2PBP_2$.

Where, $PBP_1$ represents the initial peak brightness parameter corresponding to the display panel, and $PBP_2$ represents the initial peak brightness parameter corresponding to the display panel adjacent to the second peripheral sub-region in the row direction or in the column direction; and $k_1$~$k_2$ represent weight coefficients, and $k_1 \geq k_2$.

Optionally, in the above display apparatus provided by an embodiment of the present disclosure, each second peripheral sub-region is divided into a plurality of sub-sub-regions in sequence in the direction away from the center of the display panel.

For a target peak brightness parameter $PBP=k_1PBP_1+k_2PBP_2$ corresponding to each sub-sub-region, the farther the sub-sub-region is from the center of the display panel, the smaller $k_1$ is, and the larger $k_2$ is.

Optionally, in the above display apparatus provided by an embodiment of the present disclosure, in each second peripheral sub-region, a weight coefficient of the display panel of the sub-sub-region farthest from the center of the display panel equals to a weight coefficient corresponding to an adjacent display panel.

In the display panel, a range of the peripheral regions may be determined according to the actual brightness difference such as a size of the display panel, which is not limited here. Optionally, in some embodiments, when an area of the second peripheral sub-regions is greater than or equal to twice an area of the first peripheral sub-regions, the display effect is better.

During specific implementation, since the principle of solving the problem of the display apparatus is similar to that of the aforementioned display method, the implementation of the display apparatus may refer to the implementation of the aforementioned display method, and the repetition will not be repeated.

Optionally, in the display apparatus provided by an embodiment of the present disclosure, the target peak brightness parameter calculation module may be disposed independently of the display panel, for example, directly integrated in a system-on-chip (SOC) of the display panel, and of course may also be disposed in the display panel, which is not limited here.

Figure 5:
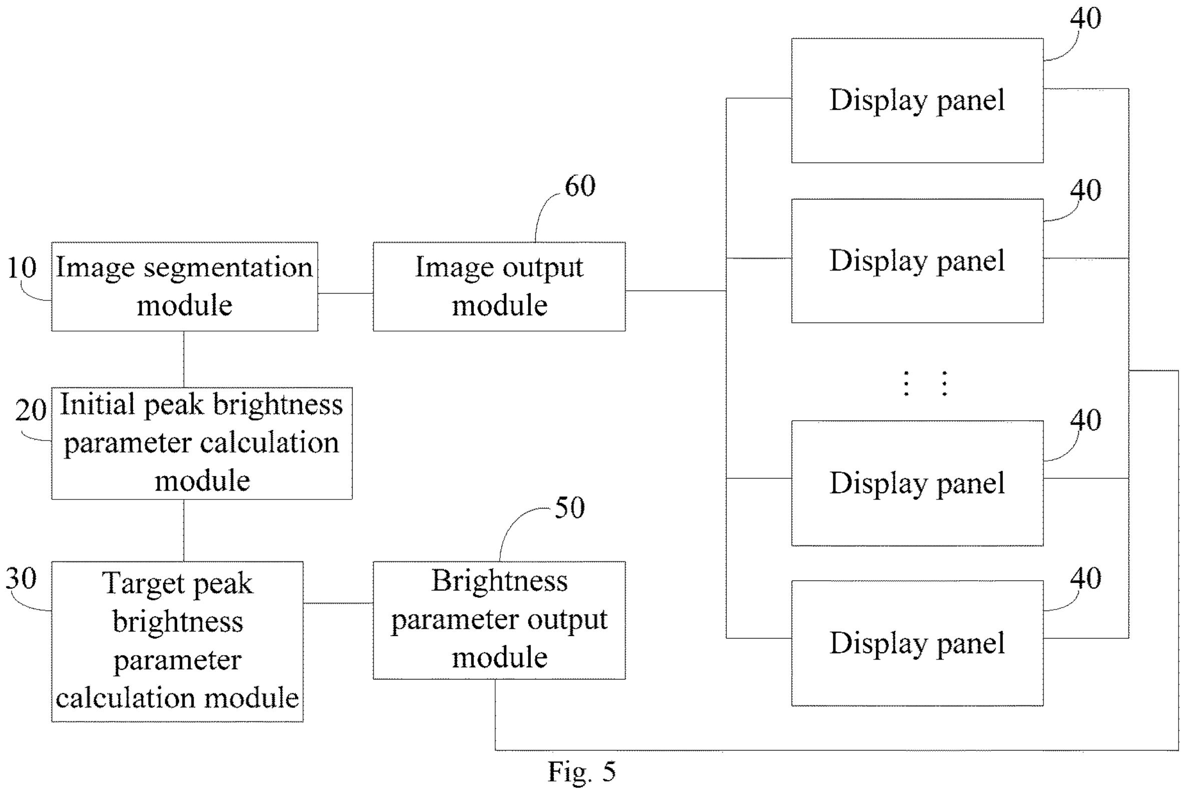
FIG. 5 is a second schematic structural diagram of a display apparatus provided by an embodiment of the present disclosure.
Figure 6:
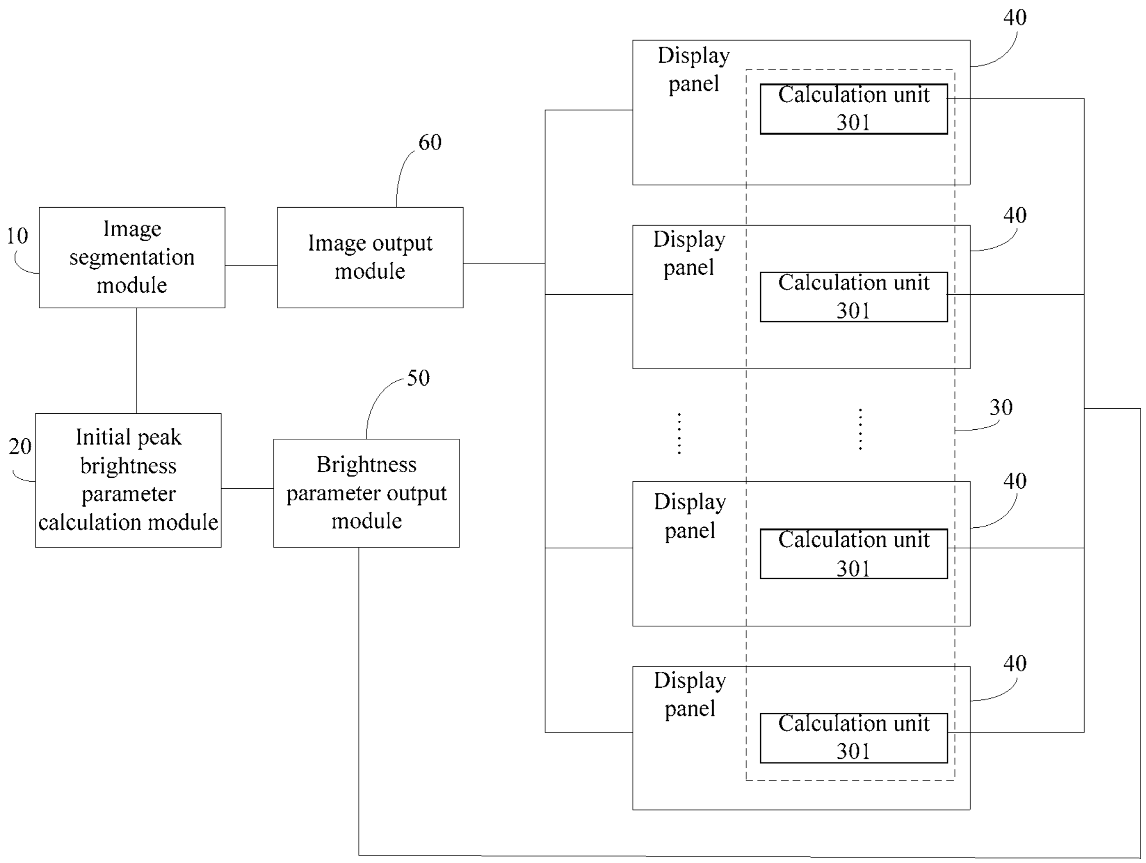
FIG. 6 is a third schematic structural diagram of a display apparatus provided by an embodiment of the present disclosure.

Optionally, in the display apparatus provided by an embodiment of the present disclosure, as shown in FIG. 5 and FIG. 6, the display apparatus further includes: a brightness parameter output module 50 and an image output module 60.

The image output module 60 is configured to send the N frames of sub-image data divided by the image segmentation module 10 to the corresponding display panels 40, respectively.

When the target peak brightness parameter calculation module is disposed independently of the display panel, as shown in FIG. 5, the brightness parameter output module 50 is configured to send the target peak brightness parameter corresponding to each display panel 40 calculated by the target peak brightness parameter calculation module 30 to the corresponding display panel 40.

When the target peak brightness parameter calculation module is disposed in the display panels, the target peak brightness parameter calculation module 30 includes N calculation units 301, and each display panel 40 is provided with one calculation unit 301. The brightness parameter output module 50 is configured to send the initial peak brightness parameter corresponding to the display panel 40 where each calculation unit 301 is located and the initial peak brightness parameter corresponding to the adjacent display panel 40 to the calculation unit 301; and each calculation unit 301 is configured to calculate the target peak brightness parameter corresponding to the display panel 40 where the calculation unit is located according to the initial peak brightness parameter corresponding to the display panel 40 and the initial peak brightness parameter corresponding to the adjacent display panel 40.

Figure 7:
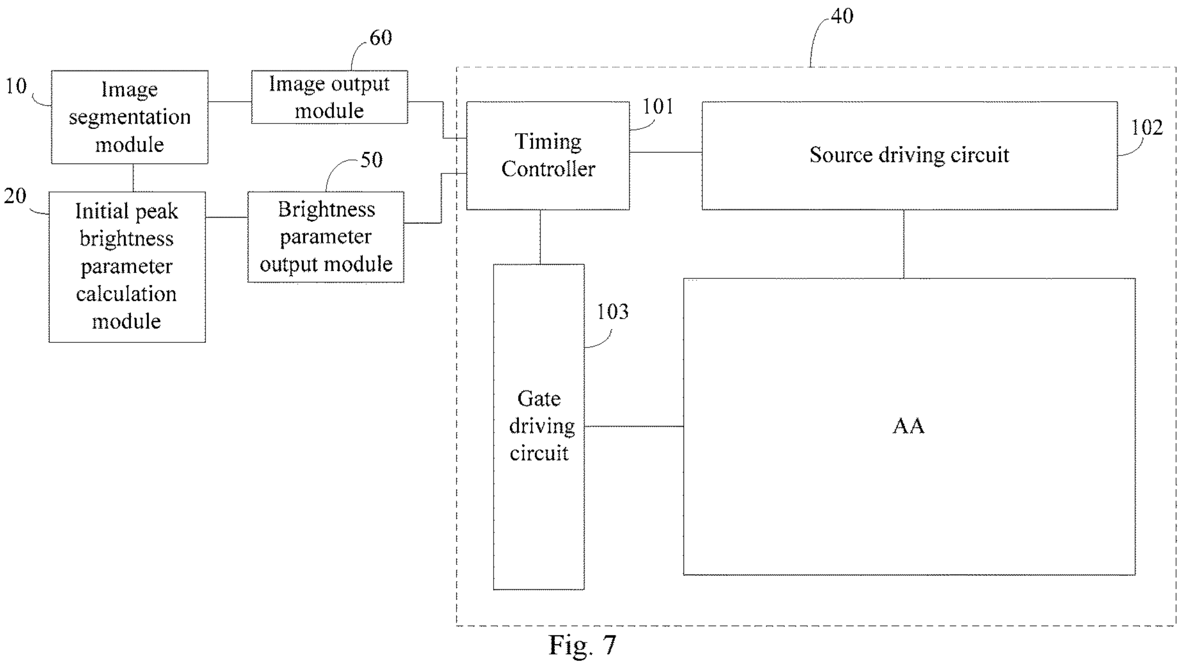
FIG. 7 is a schematic diagram of a display panel in a display apparatus provided by an embodiment of the present disclosure.

In the display apparatus provided by an embodiment of the present disclosure, as shown in FIG. 7, each display panel 40 includes a timing controller 101, a source driving circuit 102, a gate driving circuit 103 and a display region AA. Optionally, each calculation unit is integrated in the timing controller 101. Therefore, the timing controller 101 determines the target peak brightness parameter corresponding to each display sub-region of the display panel according to each initial peak brightness parameter sent by the brightness parameter output module 50, and generates display data according to the target peak brightness parameter corresponding to each display sub-region and the sub-image data sent by the image output module 60; generates a source control signal (SCS) and a gate control signal (GCS); sends the generated display data and the SCS to the source driving circuit 102; and sends the GCS to the gate driving circuit 103.

The source driving circuit 102 receives the display data and the source control signal, generates corresponding data voltage and outputs the data voltage to the display region AA through a data line.

The gate driving circuit 103 receives the gate control signal, generates a corresponding scan signal and outputs the scan signal to the display region AA through a scan line.

Optionally, in an embodiment of the present disclosure, the display panel may be an OLED display panel or an LED display panel, which is not limited herein.

According to the display apparatus and the display method therefor provided by embodiments of the present disclosure, the frame of to-be-displayed image data is received and segmented into the N frames of sub-image data corresponding to the N display panels in a one-to-one correspondence; for each display panel, the initial peak brightness parameter corresponding to the display panel is calculated according to the sub-image data corresponding to the display panel; for each display panel, the target peak brightness parameter corresponding to the display panel is calculated according to the initial peak brightness parameter corresponding to the display panel and the initial peak brightness parameter corresponding to the adjacent display panel; and each display panel performs display according to the sub-image data and the target peak brightness parameter corresponding to the display panel. Since the target peak brightness parameter corresponding to each display panel is obtained according to the initial peak brightness parameter corresponding to the display panel and the initial peak brightness parameter corresponding to the adjacent display panel, that is, output brightness of each display panel considers its own screen content and also considers screen content of the adjacent display panel, so that an output brightness difference between the adjacent display panels is reduced, the brightness difference between the adjacent display panels at a splicing position is alleviated, and the overall display effect of the display apparatus is improved.

It will be apparent to those skilled in the art that various modifications and variations may be made in the present disclosure without departing from the spirit and scope of embodiments of the present disclosure. Thus, if these modifications and variations of the present disclosure fall within the scope of the claims of the present disclosure and its equivalent technology, the present disclosure is also intended to include these modifications and variations.

What is claimed is:

1. A display method for a display apparatus, the display apparatus comprising: N display panels, and N is an integer greater than 1; and the display method comprising:

receiving a frame of to-be-displayed image data;

segmenting the frame of to-be-displayed image data into N frames of sub-image data corresponding to the N display panels in a one-to-one correspondence;

for each display panel, calculating an initial peak brightness parameter corresponding to the display panel according to the sub-image data corresponding to the display panel;

for each display panel, calculating a target peak brightness parameter corresponding to the display panel according to the initial peak brightness parameter corresponding to the display panel and an initial peak brightness parameter corresponding to an adjacent display panel; and performing display by each display panel according to the sub-image data and the target peak brightness parameter corresponding to the display panel.

2. The display method according to claim 1, wherein a display region of each display panel is divided into a central region and a peripheral region surrounding the central region;

for each display panel, calculating the target peak brightness parameter corresponding to the display panel according to the initial peak brightness parameter corresponding to the display panel and the initial peak brightness parameter corresponding to the adjacent display panel, comprises:

for each display panel, determining the initial peak brightness parameter corresponding to the display panel as a target peak brightness parameter corresponding to the central region; and calculating a target peak brightness parameter corresponding to the peripheral region according to the initial peak brightness parameter corresponding to the display panel and the initial peak brightness parameter corresponding to the adjacent display panel; and performing display by each display panel according to the sub-image data and the target peak brightness parameter corresponding to the display panel, comprises:

performing display by each display panel according to the target peak brightness parameters corresponding to the central region and the peripheral region respectively and the sub-image data.

3. The display method according to claim 2, wherein the display region of each display panel is divided into 9 display sub-regions of three rows by three columns; wherein, the display sub-region located in a second row and a second column is the central region;

the peripheral region comprises 4 first peripheral sub-regions and 4 second peripheral sub-regions; the display sub-region located in an $x^{th}$ row and a $y^{th}$ column is the first peripheral sub-region, wherein x=1 or 3, and y=1 or 3; the display sub-region located in an $n^{th}$ row and an $m^{th}$ column is the second peripheral sub-region, wherein n=2, m=1 or 3, or m=2, n=1 or 3; and calculating the target peak brightness parameter corresponding to the peripheral region according to the initial peak brightness parameter corresponding to the display panel and the initial peak brightness parameter corresponding to the adjacent display panel, comprises:

for each first peripheral sub-region in each display panel, calculating a target peak brightness parameter corresponding to the first peripheral sub-region according to the initial peak brightness parameter corresponding to the display panel, an initial peak brightness parameter corresponding to a display panel adjacent to the first peripheral sub-region in a row direction, an initial peak brightness parameter corresponding to a display panel adjacent to the first peripheral sub-region in a column direction, and an initial peak brightness parameter corresponding to a display panel adjacent to the first peripheral sub-region in a diagonal direction; and for each second peripheral sub-region in each display panel, calculating a target peak brightness parameter corresponding to the second peripheral sub-region according to the initial peak brightness parameter corresponding to the display panel, and an initial peak brightness parameter corresponding to a display panel adjacent to the second peripheral sub-region in a row direction or in a column direction.

4. The display method according to claim 3, wherein the target peak brightness parameter PBP corresponding to each first peripheral sub-region in each display panel is calculated according to a following formula:

$$PBP=k_1PBP_1+k_2PBP_2+k_3PBP_3+k_4PBP_4;$$

wherein, $PBP_1$ represents the initial peak brightness parameter corresponding to the display panel, $PBP_2$ represents the initial peak brightness parameter corresponding to the display panel adjacent to the first peripheral sub-region in the row direction, $PBP_3$ represents the initial peak brightness parameter corresponding to the display panel adjacent to the first peripheral sub-region in the column direction, and $PBP_4$ represents the initial peak brightness parameter corresponding to the display panel adjacent to the first peripheral sub-region in the diagonal direction; and $k_1$~$k_4$ represent weight coefficients, and $k_1 \geq k_2 = k_3 \geq k_4$.

5. The display method according to claim 4, wherein each first peripheral sub-region is divided into a plurality of sub-sub-regions in sequence in a direction away from a center of the display panel; and for a target peak brightness parameter $PBP=k_1PBP_1+k_2PBP_2+k_3PBP_3+k_4PBP_4$ corresponding to each sub-sub-region, the farther the sub-sub-region is from the center of the display panel, the smaller $k_1$ is, and the larger $k_2$, $k_3$ and $k_4$ are.

6. The display method according to claim 5, wherein in each first peripheral sub-region, a weight coefficient of the display panel of the sub-sub-region farthest from the center of the display panel equals to a weight coefficient corresponding to an adjacent display panel.

7. The display method according to claim 3, wherein the target peak brightness parameter PBP corresponding to each second peripheral sub-region in each display panel is calculated according to a following formula:

$$PBP=k_1PBP_1+k_2PBP_2;$$

wherein, $PBP_1$ represents the initial peak brightness parameter corresponding to the display panel, and $PBP_2$ represents the initial peak brightness parameter corresponding to the display panel adjacent to the second peripheral sub-region in the row direction or in the column direction; and $k_1$~$k_2$ represent weight coefficients, and $k_1 \geq k_2$.

8. The display method according to claim 7, wherein each second peripheral sub-region is divided into a plurality of sub-sub-regions in sequence in a direction away from a center of the display panel; and for a target peak brightness parameter $PBP=k_1PBP_1+k_2PBP_2$ corresponding to each sub-sub-region, the farther the sub-sub-region is from the center of the display panel, the smaller $k_1$ is, and the larger $k_2$ is.

9. The display method according to claim 8, wherein in each second peripheral sub-region, a weight coefficient of the display panel of the sub-sub-region farthest from the center of the display panel equals to a weight coefficient corresponding to an adjacent display panel.

10. The display method according to claim 3, wherein an area of the second peripheral sub-regions is greater than or equal to twice an area of the first peripheral sub-regions.

11. A display apparatus, for executing the display method according to claim 1.

* * * * *